Patented Mar. 29, 1949

2,465,340

UNITED STATES PATENT OFFICE 2,465,340

COSMETIC CAKE PRODUCT

Herman Sharlit, New York, N. Y., assignor to Helena Rubinstein, Inc., New York, N. Y., a corporation of New York No Drawing. Application April 2, 1946, Serial No. 659,164

6 Claims. (Cl. 167—90)

The present invention relates to a cosmetic make-up cake, and more particularly to a substantially dry solid cosmetic make-up cake emulsifiable with water by rubbing the surface of the cake with a moistened applicator. The emulsifiable cosmetic can be applied to the skin of the user in the form of an evenly distributed thin film which upon drying forms on the skin a pigmented powder cover.

Cosmetic make-up cakes of this type have heretofore been manufactured by preparing an aqueous emulsion containing water-insoluble pulverulent inert texture ingredients, such as talc, clay, kaolin, titanium dioxide, zinc stearate and the like, some pigments, an oily material compatible with human skin, such as mineral oil, petrolatum, lanolin, spermaceti or mixtures thereof, and a water soluble binder, such as soap or soap equivalents, evaporating the water, and compressing the remaining material into cake form. The binder serves to supply a homogeneous covering to the skin by keeping the texture ingredients and the pigments bound within the film formed on the skin.

One objection to this known type of cosmetic make-up is its tendency to render and to keep the skin uncomfortably dry. Another disadvantage is that in some cases cosmetic make-ups of the type described give rise to the formation of pimples within the depths of the skin.

One object of the present invention is to provide an emulsifiable make-up cake which is free of the above mentioned disadvantages. Another object of the invention is to provide a new and simple process for producing emulsifiable cosmetic make-up cakes without going through the steps of emulsifying the ingredients with water and subsequently evaporating the water.

According to the present invention these objects are accomplished by incorporating into the make-up material dehydrated skim milk as a binder. It has been found that if native milk protein is used as a binder the skin which is covered with the make-up film retains its natural moisture. Moreover, emulsifiable make-up cakes in which milk protein is used as a binder instead of soap or soap-like materials will not irritate even extremely sensitive skin and will not cause the formation of pimples or the like.

When dry skim milk is used as binder it is not necessary to emulsify the ingredients of the make-up cake in water and to evaporate the water, but the milk powder can be mixed and pulverized with the texture ingredients and pigments and the necessary oily components as well as any other liquid or semi-liquid additions can be directly incorporated into this powdery mixture which is then finely pulverized again and compressed into cake form.

It has been found that best results are obtained with mixtures containing about 88 to 100 parts by weight of pulverulent water-insoluble texture ingredients and pigments, about 10 to 11 parts by weight of an oily substance selected from the group consisting of mineral oil, petrolatum, lanolin, spermaceti and mixtures thereof, and about 5 to 15 parts by weight of dehydrated skim milk as a binder.

According to a preferred embodiment of the invention, the mixture may further contain about 10 parts by weight of glycerol and about 1 part by weight of a wetting agent such as sodium lauryl sulphate.

The following examples may serve to illustrate the invention.

Example I 70 lbs. talc were mixed with 15 lbs. titanium dioxide, about 3 lbs. pigments, about 15 lbs. dehydrated skim milk, and about 0.25 lb. sodium lauryl sulfate.

The mixture was passed through a micro-pulverizer to obtain complete intermingling of the finely distributed ingredients.

Then the powdery mass was placed in a suitable mixer and 5 lbs. mineral oil, 5 lbs. yellow petrolatum and 10 lbs. glycerol were added.

The combined materials were again passed through the micro-pulverizer and the material was then compressed into cake form and ready for use.

Example II 50 lbs. talc were finely pulverized with 40 lbs. colloidal kaolin, about 4 lbs. pigments, 10 lbs. dehydrated skim milk, and 1 lb. sodium lauryl sulfate.

8 lbs. mineral oil, 3 lbs. Lanolin, 10 lbs. glycerol, 5 oz. perfume and 2 oz. each of methyl parahydroxy benzoate and propyl parahydroxy benzoate (bactericides) were then added and the whole was once more passed through a micro-pulverizer and then compressed into cake form.

Example III 70 lbs. talc were finely pulverized with 15 lbs. zinc stearate, 10 lbs. titanium dioxide, about 5 lbs. pigments and about 5 lbs. dehydrated skim milk, together with about 1 lb. sodium lauryl sulfate.

Then 6 lbs. mineral oil, 4 lbs. spermaceti, 1 lb.

lanolin, 10 lbs. glycerin, 2 lbs. cetyl alcohol, 5 oz. perfume, 2 oz. methyl parahydroxy benzoate and 2 oz. of propyl parahydroxy benzoate were added to the mixture and the whole was again passed through a micro-pulverizer and finally compressed into cake form.

It should be understood that the preceding examples are given as illustrations and are not intended to limit the scope of the invention except as expressed in the following claims.

I claim:

1. A substantially dry solid cosmetic make-up cake emulsifiable with water by rubbing the surface of the cake with a moistened applicator, said cake consisting of a compressed body containing an intimate mixture of about 88 to 100 parts by weight of water-insoluble pulverulent inert texture ingredients including about 3 to 5 parts by weight of pigments with about 10 to 11 parts by weight of an oily material compatible with human skin, and about 5 to 15 parts by weight of dehydrated skim milk as a binder.

2. A substantially dry solid cosmetic make-up cake emulsifiable with water by rubbing the surface of the cake with a moistened applicator, said cake consisting of a compressed body containing an intimate mixture of about 88 to 100 parts by weight of water-insoluble pulverulent inert texture ingredients including about 3 to 5 parts by weight of pigments with about 10 to 11 parts by weight of an oily material compatible with human skin, about 10 parts by weight of glycerol, and about 5 to 15 parts by weight of dehydrated skim milk as a binder.

3. A substantially dry solid cosmetic make-up cake emulsifiable with water by rubbing the surface of the cake with a moistened applicator, said cake consisting of a compressed body containing an intimate mixture of about 88 to 100 parts by weight of pulverulent inert texture ingredients including about 3 to 5 parts by weight of pigments with about 10 to 11 parts by weight of an oily material compatible with human skin, about 10 parts by weight of glycerol, from about 0.25 to about 1 part by weight of a wetting agent, and about 5 to 15 parts by weight of dehydrated skim milk as a binder.

4. A substantially dry solid cosmetic make-up cake emulsifiable with water by rubbing the surface of the cake with a moistened applicator, said cake consisting of a compressed body containing an intimate mixture of about 70 parts by weight of talc, 15 parts by weight of titanium dioxide, about 3 parts by weight of pigments, 15 parts by weight of dehydrated skim milk, 0.25 part by weight of sodium lauryl sulfate, 5 parts by weight of mineral oil, 5 parts by weight of yellow petrolatum, and 10 parts by weight of glycerin.

5. A substantially dry solid cosmetic make-up cake emulsifiable with water by rubbing the surface of the cake with a moistened applicator, said cake consisting of a compressed body containing an intimate mixture of about 50 parts by weight of talc, 40 parts by weight of colloidal kaolin, about 4 parts by weight of pigments, about 10 parts by weight of dehydrated skim milk, 1 part by weight of sodium lauryl sulfate, 8 parts by weight of mineral oil, 3 parts by weight of lanolin, 10 parts by weight of glycerol, and about 0.5 parts by weight of perfume and bactericidal agents.

6. A substantially dry solid cosmetic make-up cake emulsifiable with water by rubbing the surface of the cake with a moistened applicator, said cake consisting of a compressed body containing an intimate mixture of about 70 parts by weight of talc, 15 parts by weight of zinc stearate, 10 parts by weight of titanium dioxide, about 5 parts by weight of pigments, about 5 parts by weight of dehydrated skim milk, 1 part by weight of sodium lauryl sulfate, 6 parts by weight of mineral oil, 4 parts by weight of spermaceti, 1 part by weight of lanolin, 10 parts by weight of glycerol, 2 parts by weight of cetyl alcohol, and about 0.5 part by weight of perfume and bactericidal agents.

HERMAN SHARLIT.

REFERENCES CITED

The following references are of record in the file of this patent:

UNITED STATES PATENTS

| Number | Name | Date |
|---|---|---|
| 933,395 | Sherman | Sept. 7, 1909 |
| 1,668,382 | Schroeder et al. | May 1, 1928 |
| 2,025,943 | Factor | Dec. 31, 1935 |
| 2,034,697 | Factor | Mar. 24, 1936 |
| 2,101,843 | Factor et al. | Dec. 14, 1937 |

FOREIGN PATENTS

| Number | Country | Date |
|---|---|---|
| 468,290 | Great Britain | July 2, 1937 |
| 593,145 | Germany | Feb. 22, 1934 |

OTHER REFERENCES

Journal of the American Medical Assn., Aug. 22, 1942, page 1409.